US006827668B2

(12) United States Patent
Frei et al.

(10) Patent No.: US 6,827,668 B2
(45) Date of Patent: Dec. 7, 2004

(54) ENGINE CONTROL SYSTEM

(75) Inventors: Rasmus Frei, Ludwigsburg (DE); Andreas Frank, Sindelfingen (DE); Markus Paeulgen, Esslingen/Neckar (DE); Marko Poljansek, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/220,239

(22) PCT Filed: Dec. 29, 2001

(86) PCT No.: PCT/DE01/04947
§ 371 (c)(1),
(2), (4) Date: Oct. 11, 2002

(87) PCT Pub. No.: WO02/053952

PCT Pub. Date: Jul. 11, 2002

(65) Prior Publication Data

US 2003/0176259 A1 Sep. 18, 2003

(30) Foreign Application Priority Data

Dec. 30, 2000 (DE) ......................... 100 65 781

(51) Int. Cl.$^7$ .............................. F16H 61/02
(52) U.S. Cl. ................. 477/121; 477/905; 74/335; 701/59
(58) Field of Search ............ 477/97, 115, 120, 477/121, 905; 74/335; 701/51, 55, 58, 59

(56) References Cited

U.S. PATENT DOCUMENTS

| 4,829,434 | A | * | 5/1989 | Karmel et al. | ................. | 701/59 |
| 5,251,512 | A | * | 10/1993 | Koenig et al. | ............... | 477/120 |
| 5,895,435 | A | * | 4/1999 | Ohta et al. | .................... | 701/59 |
| 6,205,388 | B1 | * | 3/2001 | Henneken et al. | ............ | 701/51 |
| 6,497,161 | B2 | * | 12/2002 | Poljansek et al. | ............. | 74/335 |
| 6,592,493 | B2 | * | 7/2003 | Loeffler et al. | ............. | 477/115 |

FOREIGN PATENT DOCUMENTS

| DE | 39 22 051 | 1/1991 |
| DE | 41 11 023 | 10/1992 |
| DE | 41 36 613 | 5/1993 |
| DE | 195 24 914 | 1/1997 |
| DE | 197 33 464 | 2/1998 |
| DE | 197 48 424 | 5/1999 |
| DE | 198 14 483 | 10/1999 |
| DE | 199 63 468 | 7/2001 |
| EP | 0 653 730 | 5/1995 |

OTHER PUBLICATIONS

"Die adaptive Getriebesteuerung für die Automatikgetriebe der BMW Fahrzeuge mit Zwölfzylindermotor" by A. Welter, ATZ Automobiltechnische Zeitdchrift, vol. 94, No. 9, Sep. 1992, pp. 428 to 430, 432, 434–436.

"Die adaptive Getriebesteuerung für die BMW–Automobile" by A. Welter et al, vol. 95, No. 9, Sep. 1993, pp. 420 to 421, 423 to 424, 426, 431–434.

* cited by examiner

Primary Examiner—Richard M. Lorence
(74) Attorney, Agent, or Firm—Walter Ottesen

(57) ABSTRACT

The system of the invention for adjusting a transmission ratio in a transmission, which is built into a motor vehicle, includes at least two determining elements with the aid of which values are determined based on different determining modes. These values represent the driving behavior of the driver of the motor vehicle. According to the invention, administrator means are provided with the aid of which the determined values are called up by the determining elements. Then, at least one counter value is changed in counter means in dependence upon the called up values. Finally, the transmission ratio is set at least in dependence upon the outputted values.

7 Claims, 6 Drawing Sheets

| Basic Type | Adaptation Method | Reaction |
|---|---|---|
| NONE | V | current type is adapted type according to method V |
| G | NONE | current type is basic type G, no adaptation |
| G | V | current type is basic type G, adaptation in background according to method V |
| NONE | NONE | not permitted |

Fig. 4

| Special 35 | Driving Operation 34 | Kickdown 33 | Gradient 32 | Start Drive 31 | |
|---|---|---|---|---|---|
| 0 | 1 | 1 | 1 | 0 | Start Drive 31 |
| 0 | 1 | 0 | 0 | 0 | Gradient 32 |
| 0 | 1 | 0 | 0 | 0 | Kickdown 33 |
| 0 | 0 | 0 | 0 | 0 | Driving 34 Operation |
| 0 | 0 | 0 | 0 | 0 | Special 35 |

Fig. 5

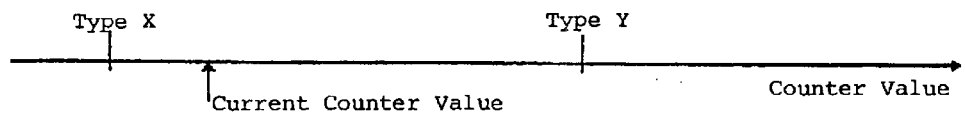

Fig. 6

ENGINE CONTROL SYSTEM

FIELD OF THE INVENTION

The invention relates to a system for adjusting a transmission ratio in a transmission built into a motor vehicle.

BACKGROUND OF THE INVENTION

In the control of a stepped automatic transmission (AT), an automated manual shift transmission (ASG) or a continuously variable transmission (CVT), adaptive transmission controls are known, for example, from U.S. Pat. No. 5,157,609 and DE 41 36 613 C as well as the article from ATZ, Automobiltechnische Zeitschrift 94 (1992) 9, starting at page 428, and ATZ, Automobiltechnische Zeitschrift 95 (1993) 9, starting at page 420. In automatic transmissions, the transmission ratio changes are, in general, determined in dependence upon the vehicle longitudinal speed and the engine load (throttle flap angle). This takes place by means of a characteristic field. In adaptive transmission control systems, the characteristic field (with which the transmission ratio changes are determined) can be adapted to the behavior of the driver (driver type), to the traffic situation and/or to the traffic situation to which the vehicle is subjected. In classifying the behavior of the driver, it is generally evaluated whether the driver is more interested in a driving-power orientated driving or is more interested in a consumption-optimized driving. In the evaluation of the traffic situation or driving situation, one can, for example, distinguish whether the vehicle is in city traffic ahead of or in a curve, on a hill or in overrun operation. Depending upon the evaluation of the above-mentioned points, the particular suitable characteristic line is selected from a number of different characteristic lines. In addition, a shift of the basic shift characteristic field (as described in U.S. Pat. No. 5,857,161) can be provided.

The classification of the driver of a vehicle has a decisive influence on the selection of the transmission gear to be set in addition to the following: the so-called driving situations, such as an uphill travel, a driving on a slippery roadway (winter), a driving with a cold engine (warmup) or a driving in the curve (curve). As a rule, here, one distinguishes between the more fuel-consumption-orientated driver type and the more driving-power-orientated driver type in one, two or multiple steps or continuously. Various methods are known for determining the so-called driver type.

U.S. Pat. No. 5,351,776 discloses a hierarchically structured control of the elements of the drive train of a motor vehicle (for example, engine, clutch/torque converter, transmission). A software structure for determining the transmission ratio is shown in U.S. Pat. No. 6,216,077.

SUMMARY OF THE INVENTION

The object of the present invention is to so configure the determination the driver type that the system can be adapted in the simplest possible way to various requirements.

The system according to the invention for adjusting a transmission ratio in a transmission built into a motor vehicle includes at least two determining elements by means of which values are determined based on different determination modes which values represent the driving behavior of the driver of the motor vehicle. According to the invention, administration means are provided by means of which the determined values are called up from the determining elements. Then, at least one counter value is changed in the counting means in dependence upon the called-up values. Finally, the transmission ratio is set in dependence upon the outputted values.

As mentioned initially herein, the determination of a driver type for influencing the shift strategy of a stepped automatic transmission (AT), an automatic shift transmission (ASG) or a continuously variable transmission (CVT) is a method known for years. According to the present invention, the driver type detection is split up into variant parts and non-variant parts and thereafter modularized based thereupon. The system obtained in this manner is then imaged into an object-orientated model. In this way, a system of driver-type detection arises which offers special advantages in the maintenance, reusability and the applicability by the motor vehicle manufacturer. The method to use a driver type for influencing the shift strategy of a transmission to be adjusted automatically is, at the present time, differently represented by the motor vehicle manufacturers; whereas, some manufacturers have used these methods already for years and therefore already have a definite impression and accent as to the nature in accordance with which viewpoints a driver is to be determined; there are other manufacturers who have not up to now used a type of driver in the transmission control. The system according to the invention ensures a unitary determination sequence wherein the special wants of the vehicle manufacturers can be tied into the various parts. In order to provide a starting basis for the manufacturers, which up to now have not yet used a type of driver in the transmission control, a special accent of the various parts of the driver-type determination was developed in accordance with the invention which nonetheless makes a useable driver type available in an especially short and brief form. This accent functions as an example in the embodiment of the present invention.

In an advantageous configuration of the invention, determination means are provided with which a driver-type value is determined in dependence upon the instantaneous counter value and this driver type value represents the driving performance of the driver of the motor vehicle. The transmission ratio is adjusted at least in dependence upon the driver-type value.

In a further advantageous embodiment of the invention, the counting means are so configured that, in dependence upon the called-up values:

the counter value is incremented or decremented;

the counter value is set to a specific value; and/or, an upper and/or lower limit for the counter value is set.

In an especially advantageous embodiment, it is provided that in the administration means it is stored which one of the determining elements can be called up and which one of the determining elements cannot be called up. Especially, the administration means can be so configured that at least one determining element is not called up, that is, it is never called up during driving operation or is deactivated.

The above-mentioned embodiment of the invention makes especially clear the advantage of the simple applicability. The different determining elements can, depending upon the wants of the vehicle manufacturer, contribute in any desired combination to the determination of the driver type. For this purpose, the (variant) administration means only have to be correspondingly programmed; whereas, the other components of the driver-type determination, especially the determination elements, remain unchanged.

In another advantageous embodiment of the invention, the administration means are so configured that the call-up of at least one of the determining elements takes place in dependence upon the determination of the value of another one of the determining elements. In this configuration of the invention, the (variant) administration means coordinate which of the determining elements can be active in which sequence, that is, which of the determining elements are permitted to actively supply their contribution to the driver-type determination in parallel to the other determining elements.

The determination means can be so configured that the instantaneous counter value is assigned pregivable time intervals and the driver-type value is determined from the assignment to one of the part intervals with the driver-type value representing the driving performance of the driver of the motor vehicle.

The determining elements can be so configured that:

during the start-drive operation of the vehicle, the position of the accelerator pedal, which is actuated by the driver, is evaluated to determine a first value which represents the driving performance of the driver of the motor vehicle; and/or, the rate of change of the position of the accelerator pedal, which is actuated by the driver of the motor vehicle, is evaluated to determine a second value, which represents the driving performance of the driver of the motor vehicle; and/or, exceeding of the position of the accelerator pedal, which is actuated by the driver of the motor vehicle beyond a pregivable threshold value is evaluated to determine a third value which represents the driving performance of the driver of the motor vehicle; and/or, a fourth value, which represents the driving performance of the driver of the motor vehicle, is determined from the quotient of the position of the accelerator pedal, which is actuated by the driver of the motor vehicle, and the road speed of the motor vehicle.

The following advantages result with respect to the various criteria:

Simple applicability of the system of the invention: the priority of different aspects for the driver-type determination (different determining modes in the determination means) can be applied as desired in the administration means and without change of the determination means.

Expandability of the invention: the number of determining means is practically unlimited. The expansion of the driver-type recognition according to the invention is simple because the system of the invention makes available fixed defined interfaces. For a new determination means, only an identification code has to be given and made known in the administration means, that is, the identification code is stored.

Functionality of the system of the invention: the actual driver-type evaluation (in the determining elements, in the determination means and in the counting means) is not included in the prioritization (in the administration means). For this reason, a high flexibility is provided with respect to different requirements of various vehicle manufacturers.

The reusability of the system of the invention:

For different requirements of the total system, only the individual determining elements need be activated or deactivated or changed. The entire system and the structure for the driver-type recognition remain, however, unchanged.

For the same component requirements in a different context, individual determining elements can be simply exchanged because of the defined interfaces.

Transverse connections between determining elements for suitable prioritization (which could greatly inhibit reusability) are avoided by the prioritization by the administration means.

BRIEF DESCRIPTION OF THE DRAWINGS

The invention will now be described with reference to the drawings wherein:

FIGS. 4 and 5 show tables; and,

FIGS. 6, 7, 8, 9 and 10 show different dependencies of different variables.

DESCRIPTION OF THE PREFERRED EMBODIMENTS OF THE INVENTION

Figure 1:
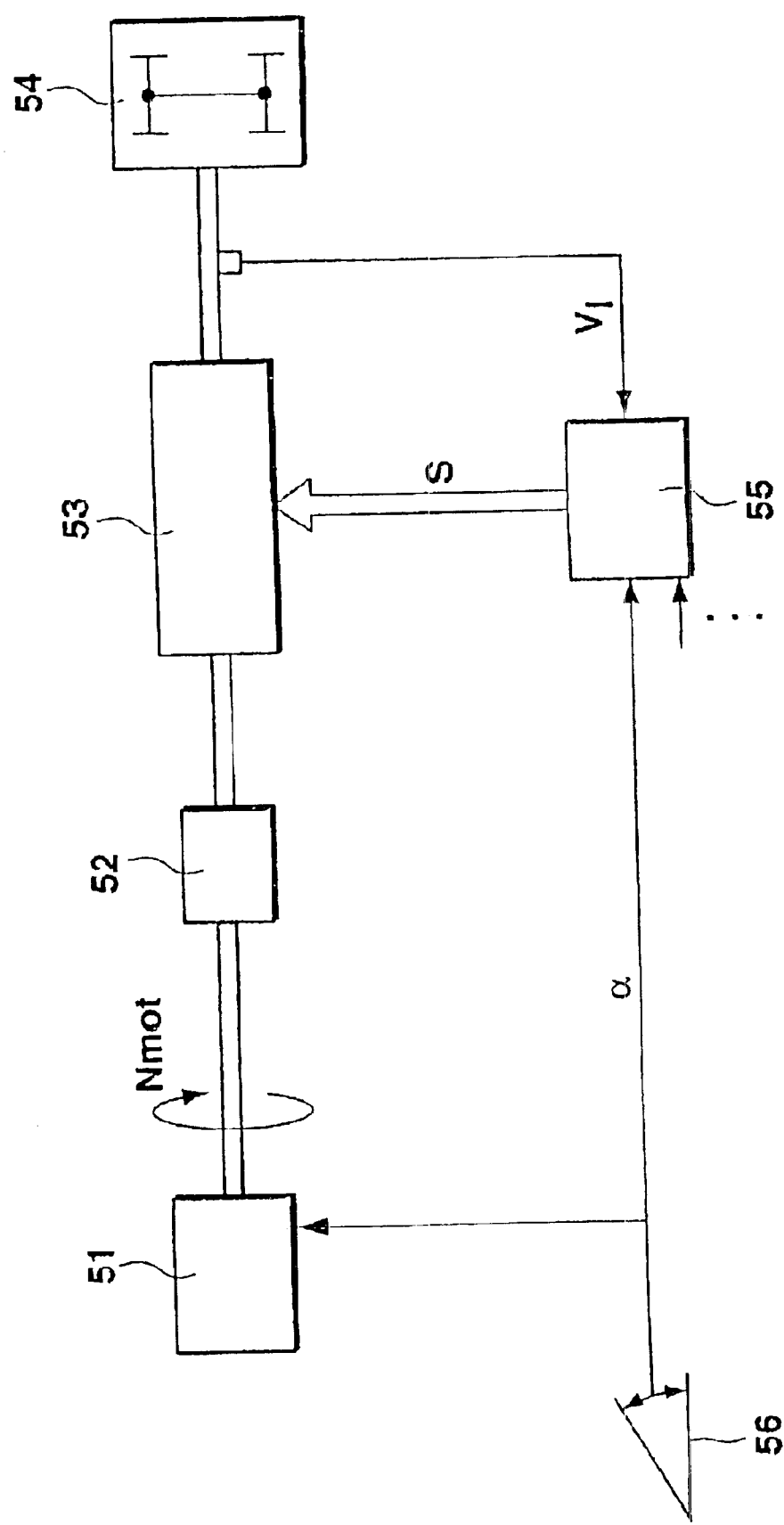
FIG. 1 shows schematically the drive train of a motor vehicle in the context of a block circuit diagram.

FIG. 1 shows schematically the drive train of a motor vehicle. The vehicle engine 51 having the engine rpm Nmot is connected to the drive wheels 54 of the vehicle via a clutch or a torque converter 52 and via the transmission 53. The driver of the vehicle actuates the accelerator pedal 56 and sets an accelerator pedal angle α. The power and/or torque of the vehicle engine 51 is controlled by the position α of the accelerator pedal 56. In addition, the position α of the accelerator pedal 56 as well as additional signals are supplied to the transmission control unit 55. As additional signals, the following signals are, for example, included: the transverse acceleration sensor, the wheel rpm sensors, a temperature sensor and/or signals from the engine control. The transmission control unit 55 then determines a transmission gear essentially in dependence upon the input signals. The transmission gear is set on the transmission 53 by means of the signal S.

Figure 2:
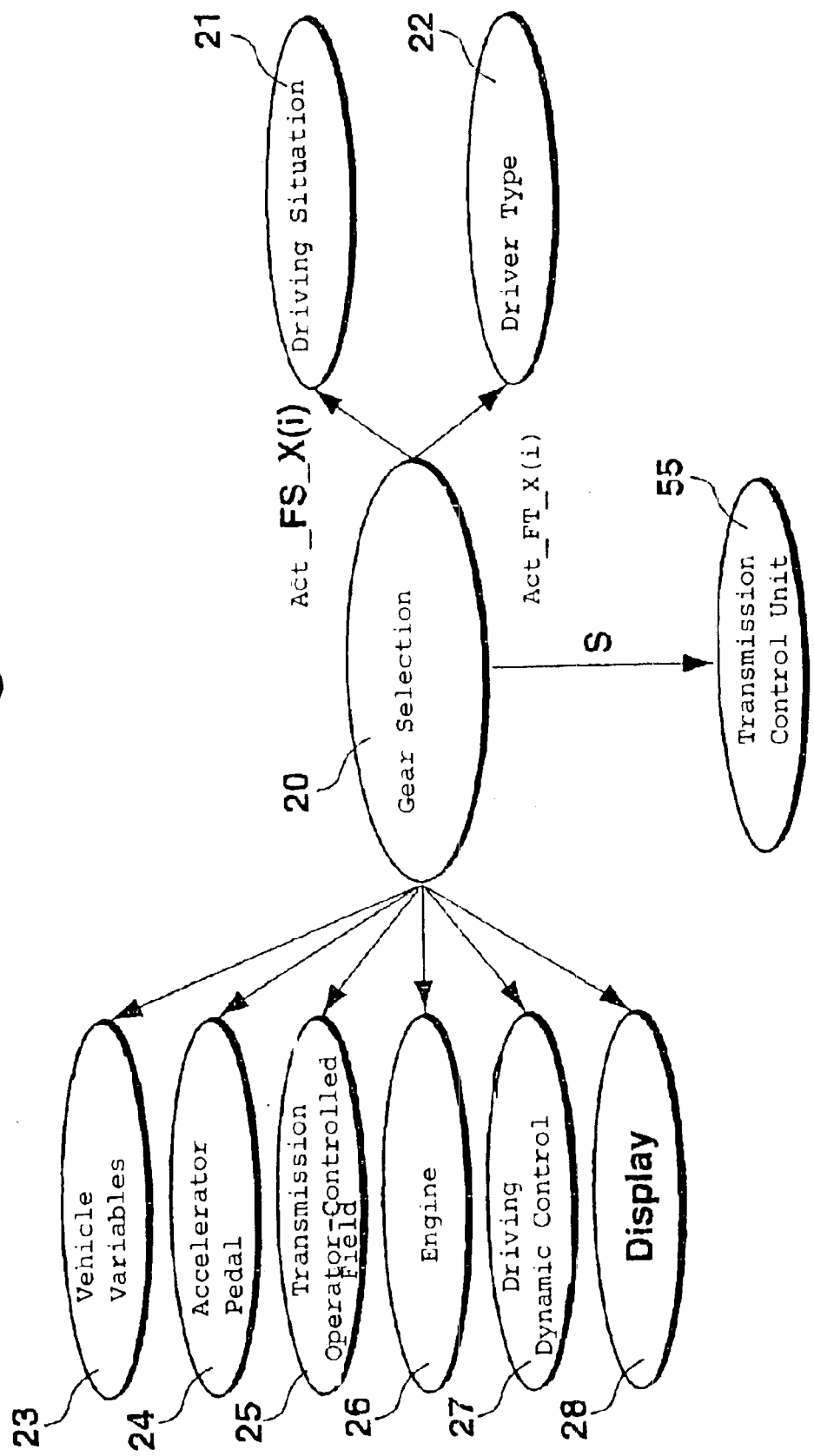
FIG. 2 shows a total overview of the structure of the transmission control.

FIG. 2 shows a total overview of the structure of a transmission control. Here, the actual selection of the transmission gear to be set takes place in the gear selection 20. This gear information is supplied to the transmission 53 (FIG. 1) as position signal S.

The information for determining the transmission gear to be adjusted is supplied from individual components to the gear selection 20. This can, for example, take place via specific inquiry commands by the gear selection 20. The following blocks shown in FIG. 2 are presented as exemplary of the components:

Vehicle-individual data are stored in the block "vehicle variables" 23.

The position of the accelerator pedal, which is actuated by the driver, can be called up by block "accelerator pedal" 24.

The position of at least one of the selection switches (for example: P, 1, 2, 3, N, D, winter operation, economy/sport operating mode) can be inquired by the block "transmission operator-controlled field" 25. The selection switch is set by the driver of the vehicle.

The gear selection is supplied with engine data such as engine rpm, engine load and/or engine temperature by block "engine" 26.

Data with respect to the instantaneously present driving-dynamic performance is present in block "driving-dynamic control" 27.

The display in the viewing field of the driver is identified by reference numeral 28.

A quantity is determined in block "driver type" 22 which is informative as to the behavior of the driver. Here, it is, in general, evaluated whether the driver is more inclined to a driving-power orientated way of driving or is more inclined to a consumption-optimized way of driving.

A quantity is determined in block "driving situation" 21 which represents the driving situation to which the vehicle is instantaneously subjected to: uphill travel, travel on a slippery roadway (winter), driving with a cold engine (warming up), driving in a curve.

The arrows shown in FIG. 2 between the gear selection 20 and the blocks 21 to 28 are intended to illustrate specific inquiry commands by the gear selection 20. The blocks then send the desired data to the gear selection 20 in response to corresponding commands. The communication between the gear selection 20 and individual blocks can, however, also take place in that the corresponding signals are continuously conducted to the gear selection, that is, without specific inquiry commands by the gear selection 20.

The inquiry of the actual driver-type value takes place via the inquiry Act_FT_X(i) in general via any other part of the software and, in the present example, by the gear selection 20.

Figure 3:
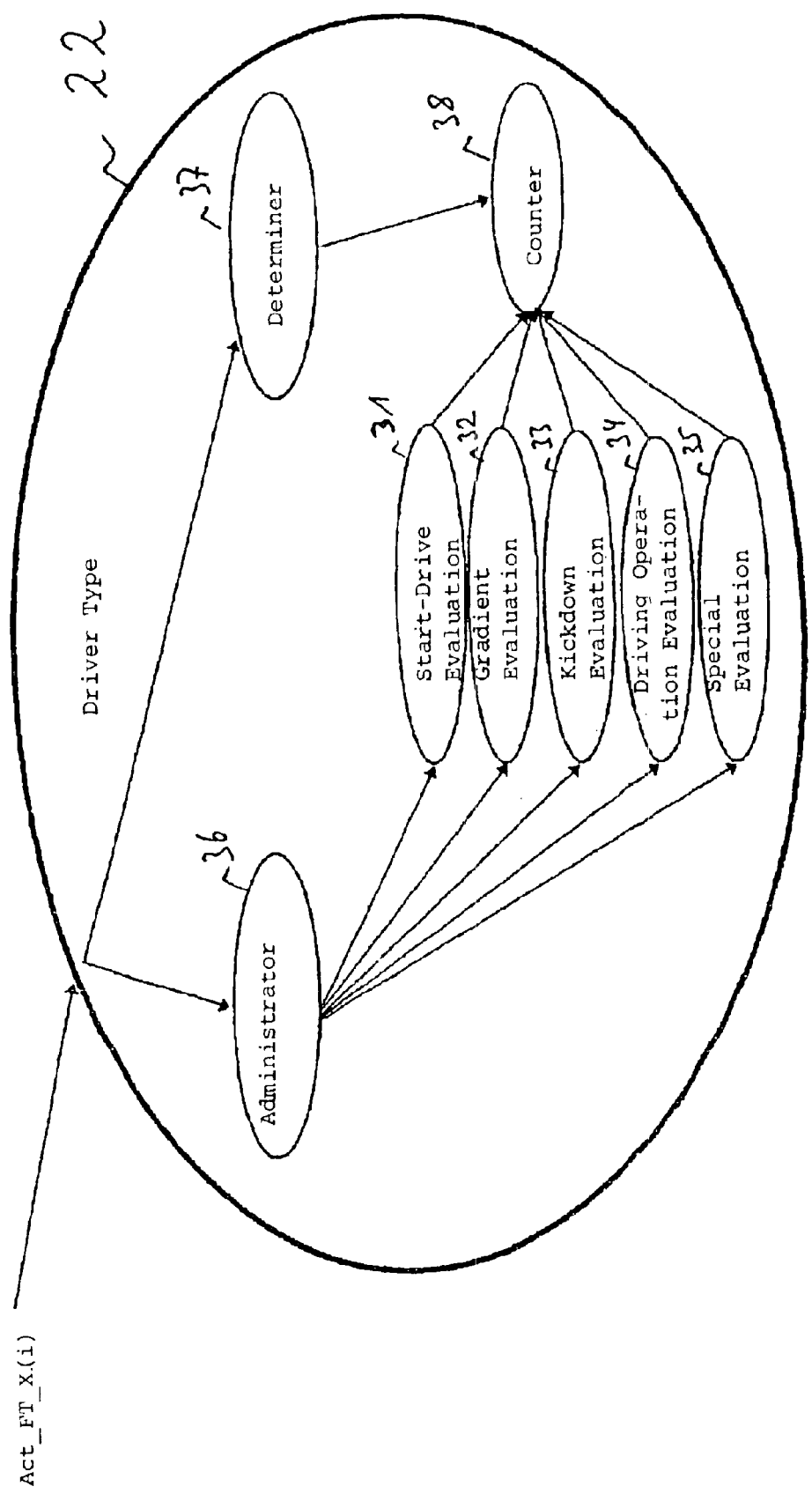
FIG. 3 discloses, in detail, the block "driving situation"

The present invention relates to the block "driver type" 22. For this reason, this block will be described in greater detail with respect to FIG. 3.

The recognition of the driver type is summarized in the object ("driver type" block 22). This object 22 contains as subobjects "administration means" 36 and a desired number of supplier objects, that is, determining elements which are characterized in the present embodiment as blocks 31, 32, 33, 34 and 35.

The instantaneously present driver type is determined in the individual supplier objects or determining elements 31 to 35.

The following description of an embodiment of the invention is partitioned into two areas. First, the invariable component is described which represents the structure of the object model and can be used again independently of the vehicle manufacturer or customer and project. Subsequently, a specific accent of the varying parts of the system of the invention is explained, on the one hand, as exemplary and to make the invention clear and, on the other hand, a new procedure is described for the determination of the driver type.

General Determination of the Driver Type

The driver type appears in this modeling as representative of "personal characteristics" of the driver. In the actual situation, this is limited essentially to the driver type needed in the transmission control.

As already mentioned, the variant described here has an administrator 36, a counter 38, a determiner 37 and so-called supply objects/determining elements 31 to 35. The supply objects 31 to 35 evaluate specific aspects of the driver-type determination and present a result of their evaluation to the counter 38. Additionally, the real driver can input specific driver types or adaptation methods with which the driver type is to be determined via the transmission operator-controlled field 25 (FIG. 2).

The object "driver type" 22 controls the driver-type recognition, stores the actually determined driver type and makes the driver type available to the outside. Accordingly, the determination of the driver type does not take place with each inquiry of the same but is undertaken cyclically, for example, once every 25 ms.

The object "driver type" 22 takes the pregiven basic type and the adaptation method from the transmission operator-controlled field 25. These are the formal informations derived from the real operator-controlled possibilities of the transmission operator-controlled field 25 (see, for example, the initially cited DE 199 63 468 A). When a basic type G is pregiven, then this basic type G becomes the actual driver type. Otherwise, the driver type is adapted and taken over (method V). If the pregiven adaptation method is "do not adapt", then no driver type is determined. In this case, a basic type G must be inputted because, otherwise, no valid driver type can be specified. The table, which is shown in FIG. 4, shows the interpretation of both informations which must be matched between the transmission operator-controlled field 25 and the object "driver type" 22.

If an adaptation is to be carried out, then the object "administrator" 36 is requested to determine a driver type in accordance with the pregiven adaptation method (table in FIG. 4). The administrator 36 has the task to coordinate the contribution determination of the supply objects 31 to 35. The monitoring and evaluation of the driver reactions in specific situations is assigned to the special supply objects 31 to 35. These have the task to observe and to evaluate the driver reactions in the situations assigned thereto. A new evaluation of the driver type is only undertaken when all supply objects 31 to 35 have had the opportunity to make a contribution.

The administrator 36 calls up the various supply objects 31 to 35 in sequence for driver type evaluation. Each supply object 31 to 35 has a clear identification ID based on which the call-up thereof takes place. In this way, the administrator 36 is independent of the number and the special characteristics of the supply objects 31 to 35. A desired exchangeability of the supply objects 31 to 35 has as a precondition that they all make available the same interface in the sense of a stereotype "supply object for the driver type recognition". In order to configure the administrator 36 completely independently of the supply objects 31 to 35, it is furthermore advantageous to image the ID's of the supply objects 31 to 35 as or onto function pointers. The special accent of the following supply objects is described in greater detail hereinafter:

1. Start-drive evaluation 31
2. Gradient evaluation 32
3. Kickdown evaluation 33
4. Driving operation evaluation 34
5. Special evaluation 35

The above make a contribution to the evaluation counter 38 in series. For this, the supply objects have the following possibilities:

Increment or decrement the actual counter by an amount.
Set the counter to a specific value.
Set the upper and lower limits of the counter.

When, in the sequential processing of the supply objects 31 to 35, the limits of the counter are changed, then the problem arises as to when these limits can be changed again. A solution therefor is defined in the following:

1. At the start of the cycle, the limits are so set that the permitted range is a maximum.
2. The supply objects 31 to 35 are called up oppositely to their priorities.
3. If several supply objects 31 to 35 want to set the same limits, then the last-active supply object wins in the cycle.

A like solution results for the setting of the driver type value. The tasks of the supply objects 31 to 35 can, as a rule, be proportioned into the following phases:

Check of the input conditions (start phase).
When the input conditions are satisfied, monitor the driver reactions and, if required, evaluate until the end conditions are satisfied.

When the end conditions are satisfied, possible evaluation of the driver reactions. Here, the contributions can be of different types.

To the outside, it is not relevant in which phase a supply object 31 to 35 is located. Since the individual evaluations (and therefore the supply objects 31 to 35) are prioritized amongst each other, it must be clear when a supply object can displace another supply object. This happens in that the supply objects output a status announcement to the outside. Here, there is only the status "active" and "inactive". In addition to the status of a supply object, it is also important to know as to whether a supply is even applied (that is, can come into use) and therefore can provide a contribution.

The administrator 36 knows all supply objects 31 to 35 and has the task to coordinate their contribution determination. The administrator notes whether the supply objects are applied and receives information from them as to whether they are active or inactive. The determination runs cyclically. At the start of the cycle, and as required, an internal initialization can take place. In each cycle, all supply objects are called up to make their contribution in the sequence corresponding to their priority. The contribution comprises a counter value, which the counter receives and processes internally. At the end of a cycle, the driver type is determined by the object "determiner" 37 from the resulting counter value.

So that the administrator 36 can control the prioritization of the supply objects 31 to 35, the administrator first checks whether the called-up supply object is permitted to become active or whether it can continue its activities. Here, the static and dynamic aspects are viewed:

In the static aspect, a check is made as to whether the particular supply object is applied positively or negatively. In the negative case, the supply object may not be active; whereas, in the positive case, the dynamic aspect is investigated.

In the dynamic aspect, a check is made as to whether other supply objects are active, which hinder the activity of the particular supply object. In this case, the particular supply object must become inactive. Each of the evaluations 31 to 35 advises the administrator 36 whether they are just then active. The administrator 36 stores this information. In addition, the information is stored in the administrator 36 as to whether an evaluation 31 to 35 may become active when other evaluations are already announced as active.

The matrix, which is shown in FIG. 5, is intended to make this clear. Here the matrix element 0 means that the assigned evaluation can become active simultaneously. The matrix element 1 means that the assigned evaluation cannot become active simultaneously. When, for example, the gradient evaluation 32 is active (see line, gradient evaluation), then the special evaluation, the start-drive evaluation and the kickdown evaluation 35, 31 and 33 may all become active, however, the drive operation evaluation 34 may not become active (see a "1" in the column "drive operation evaluation" at the crossover point with the line "gradient evaluation"). The application of the prioritization is especially simple because of the use of a clear ID for each supply object, because this ID, for example, can be entered directly into a table.

Figure 10:
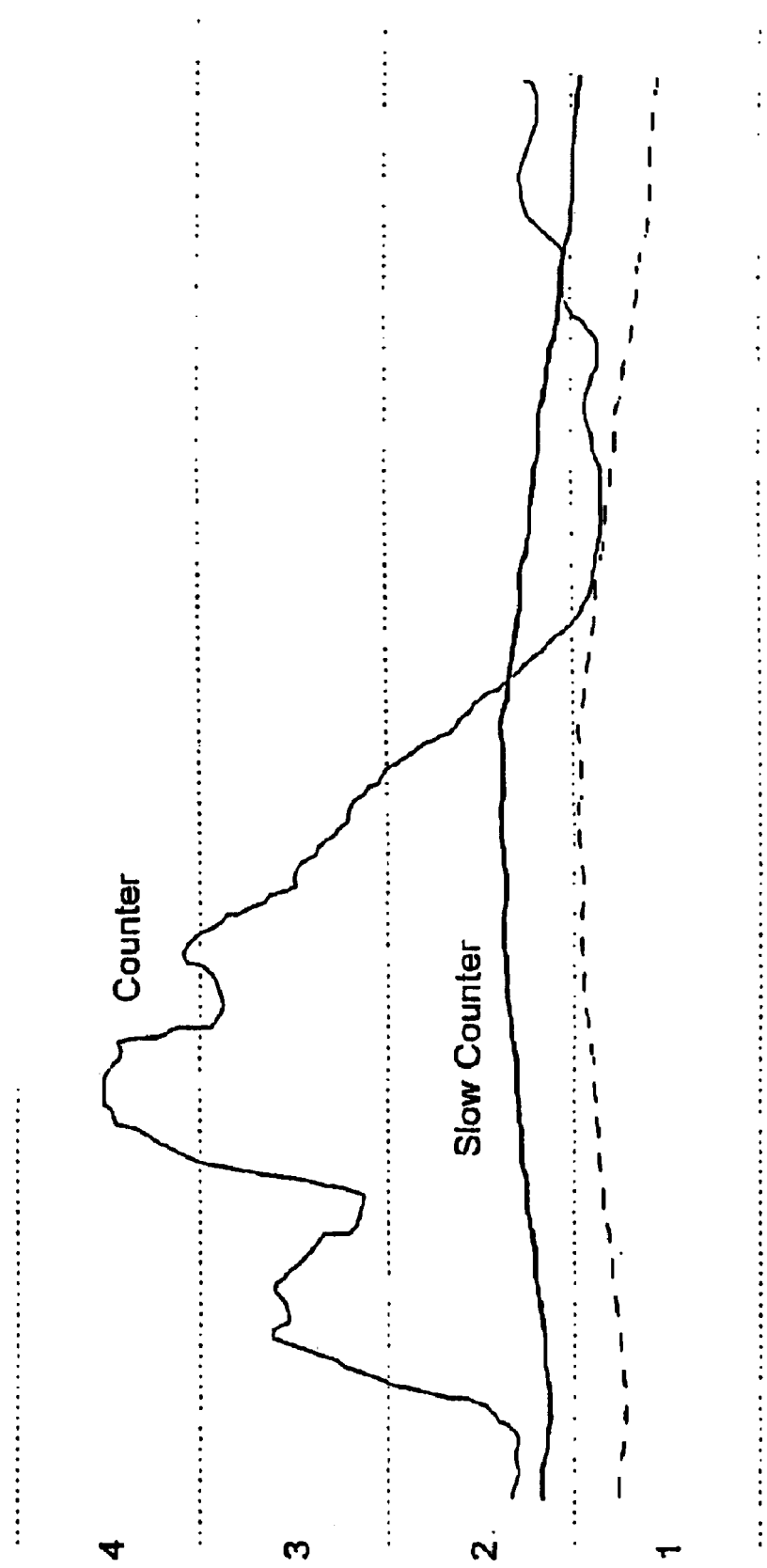

The object "counter" 38 has the essential task of collecting contributions which are supplied by the supplier objects in the form of counts. Conceivable are the basic versions "maximum former" (forms the maximum of the collected counts), "minimum former" and "adder". In this embodiment, the counter 38 determines the so-called slow counter with the supply objects from the current counter. These supply objects will be described hereinafter. The slow counter very slowly follows the counter within its own defined limits and the dynamic can be adjusted. The current driver-type evaluation counter is limited in the downward direction by the slow counter, that is, the counter can never become less than the slow counter less an offset. In addition, it can also be decided whether the slow counter should be adapted or not to the counter at vehicle standstill. The background is a long-term characterization of the driver behavior. A rapid change in the direction of "driving power orientation" or "sport" (a sporty performance is assigned to the higher counter values in most instances) is possible at any time. In FIG. 10, the correlation between the counter and the slow counter is shown by way of example.

The object "determiner" 37 has the task to compute, at the end of a cycle, from the current counter value of the counter 38, the type of driver resulting therefrom and to make this available to the object "driver type" 22.

The basis of the driver type determination in counter 38 is a number interval which is subdivided into four component intervals. Each component interval is assigned to a driver type. The determination takes place in that a counter is changed within the time interval by the actions of the driver in specific situations. At the end of a determination cycle, a check is made as to in which component interval the counter is disposed. The current driver type then results from the type assigned to this component interval. For example, there can be four driver types 1, 2, 3 and 4, which are classified with respect to each other in the following manner: 1<2<3<4. A significance is mostly assigned to these formal driver types such as in the following example:

very economic;

economic;

sporty; and, very sporty.

When all evaluations 31 to 35 have made their contributions, the new driver type is computed by the driver-type determiner 37 from the current count of the counter (and, in no way from the slow counter). The current driver type is then sent back by the determiner 37 to the object "driver type" 22 and is there stored as a new current type of driver which can be called up by the inquiry "Act FT X(i)".

The above categorization into four types of driver is strictly arbitrarily selected and there can be any desired number. Furthermore, the following procedure has been shown to be advantageous:

In addition to the driver type, one more assigning value is determined which, for example, indicates in which region between 2 types the counter value is just then disposed. For this purpose, attention is called to the example shown in FIG. 6. In this example, the following driver type data is possible: ((X, y), 0.2)

The type of driver is disposed in the interval between type X and type Y and belongs 80% to type X and 20% to type Y. Driver type data of this kind are especially helpful when, in dependence upon the association value, there is to be an interpolation in the driver-type dependent characteristic lines or characteristic fields.

Special Accent of the Supply Objects for Driver Type Determination

Each special supply object 31 to 35 arises from a stereotype of a supply object. The supply object must react to the call-ups of the administrator 36 and serve the interfaces of the administrator 36 (for example, announcing active or inactive) and the counter 38 (for example, increment the counter by an amount). The call-ups of the administrator differentiate only in the ID transmitted as parameters. The differences between the supply objects 31 to 35 therefore lie only in the especially observed vehicle variables and driver variables which are evaluated for determining the type of driver. The supply objects presented in the following arise from the demand to adapt the manner of driving of the driver in the most simple, rapid and easily applicable manner.

Start-Drive Evaluation

The start-drive evaluation recognizes 3 states:

Standstill:
at the output rpm zero.

Start-drive:
as long as the output rpm is less than a threshold.

Normal travel:
for an output rpm, which is greater than a threshold.
Only a change into the state "standstill" is possible.

Figure 7:

An evaluation takes place only in the state "start-drive" and no evaluation takes place at vehicle standstill. For evaluation, the driver-type evaluation counter is set to the value of a characteristic line in dependence upon the accelerator pedal position. For this, an example is shown in FIG. 7.

Gradient Evaluation

Figure 8:
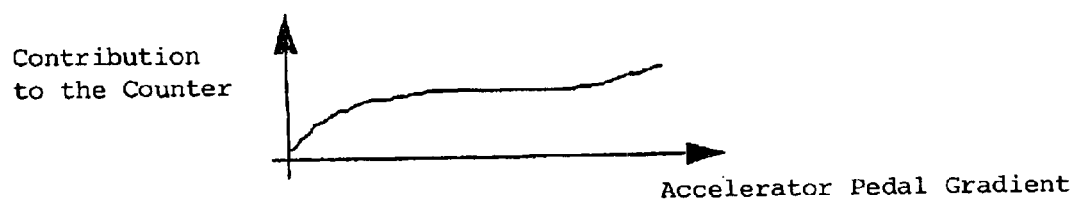

The gradient evaluation 32 moves into the active state as soon as a positive accelerator pedal gradient greater than a threshold value is detected. As soon as there is a drop below this threshold, the gradient evaluation 32 sets itself again to passive. An evaluation value is read out from a characteristic line in dependence upon the amount of the accelerator pedal gradient. The evaluation value is added to the driver-type evaluation counter. If several positive gradients are recognized one after the other (that is, there is no change into the passive state in the meantime), then only the difference to the previous evaluation value is added to the driver-type evaluation counter when this difference is positive. An example for this is shown in FIG. 8.

Kickdown Evaluation

The kickdown evaluation 33 sets itself to be active as soon as kickdown is detected (push-down of the accelerator pedal). Then, each time after the elapse of a time stage, the driver-type evaluation counter 38 is incremented by a specific value.

Driving Operation Evaluation

The driving operation evaluation 34 is always active. It functions to determine a fitting driver type from the current driving state of the vehicle when no other evaluation is active which covers special states. For this purpose, the quotient of accelerator pedal and output rpm is determined:

Quotient=10* accelerator pedal/output rpm

Figure 9:
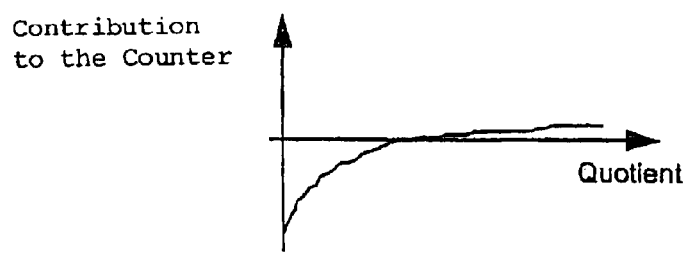

The multiplication by the factor 10 serves only to image the quotient in a region more favorable for evaluation. A new evaluation value is determined from the quotient via a characteristic line after the elapse of a time stage. The new evaluation value is added to the driver-type evaluation counter. An exemplary allocation "contribution to the counter" to "quotient" is shown in FIG. 9.

Special Evaluation

The special evaluation 35 functions to evaluate different special cases which are intended to be included in the driver-type recognition but actually require no self-evaluation such as: hot mode, warmup, winter or sport evaluation.

The special evaluation 35 reacts to the adaptive mode which was inquired of by the object "driver type" 22 in the transmission operator-controlled field 25 and was transmitted to the administrator 36 for driver type determination. The current adaptive mode is transmitted along as a parameter with the call-up of the special evaluation 35. If the current adaptive mode is normal, then the special evaluation 35 does not become active. Should however "sporty" be adapted, then the lower limit of the driver-type evaluation counter 38 is raised to a minimum value. If there is a change from the sport mode again back into the normal mode, then the lower limit is again cancelled and, additionally, an amount is subtracted from the driver-type evaluation counter 38.

In summary, the following advantages can be achieved with the invention with a view to the various criteria:

Criterion Applicability:
The priority of various aspects for the driver type determination can be applied in the administrator 36 as desired and without change of code.

Expandability Criterion:
The number of supply objects 31 to 35 is practically unlimited.
The expansion of the driver type recognition is simple because the invention provides fixedly defined interfaces. For a new supply object, only a new identifier code ID need be given and made known to the administrator 36.

Functionality Criterion:
The method for actual driver type evaluation is not included in the method for prioritization. For this reason, a high flexibility is provided relative to different requirements of different vehicle manufacturers.

Reusability Criterion:
For different requests, only the supply objects 31 to 35 need be changed; however, the structure for the driver type recognition remains constant.
For the same component requests in different contexts, supply objects can be easily exchanged via the defined interfaces.
Transverse connections between supply objects for mutual prioritization, which greatly hinder a reusability, are avoided because of the prioritization by the administrator 36.

What is claimed is:

1. A system for adjusting a transmission ratio in a transmission built into a motor vehicle, the system comprising:

at least two determining elements for determining values to provide determined values based on different determining modes with the determined values representing the driving behavior of the driver of the motor vehicle and with said determining elements having special determining modes;

counter means;

administrator means independent of said special determining modes and being for calling up said determining elements and for causing said determining elements to transmit said determined values as call-up values to said counter means according to a pregiven priority;

said counter means being for changing at least one counter value in dependence upon said call-up values;

determining means for determining a driver type value in dependence upon said counter value, said driver type value representing the driving behavior of the driver of the motor vehicle;

means for adjusting the transmission ratio at least in dependence upon said driver type value; and, said determining elements having uniform interfaces to said administrator means and having uniform interfaces to said counter means.

2. The system of claim 1, wherein said counter means are so configured that, depending upon the call-up values:

(a) the counter value is incremented or decremented;

(b) the counter value is set to a specific value; and/or, (c) an upper and/or lower limit for the counter value is set.

3. The system of claim 1, wherein said administrator means are so configured that at least one of said determining elements is not called up.

4. The system of claim 1, wherein said administrator means are configured to store information as to which of said determining elements can be called up and as to which of said determining elements cannot be called up.

5. The system of claim 1, wherein said administrator means are so configured that the call-up of at least one of said determining elements takes place in dependence upon the determination of the values of at least one other of said determining elements.

6. The system of claim 1, wherein the determining means are so configured that the instantaneous counter value is assigned to pregivable component intervals and that the driver type value is determined from the assignment to one of the component intervals, the driver type value representing the driving behavior of the driver of the motor vehicle.

7. The system of claim 1, wherein said determining elements are so configured that:

(a) during the start-drive operation of the vehicle, the position of the accelerator pedal, which is actuated by the driver of the motor vehicle, is evaluated for determining a first value which represents the driving behavior of the driver of the motor vehicle; and/or, (b) the rate of change of the position of the accelerator pedal is evaluated to determine a second value which represents the driving behavior of the driver of the motor vehicle; and/or, (c) exceeding the position of the accelerator pedal, which is actuated by the driver of the motor vehicle beyond a pregivable threshold value, is evaluated to determine a third value, which is representative of the driving behavior of the driver of the motor vehicle; and/or, (d) a fourth value, which represents the driving behavior of the driver of the motor vehicle, is determined from the quotient of the position of the accelerator pedal, which is actuated by the driver of the motor vehicle and the road speed of the motor vehicle.

* * * * *